US009578039B2

(12) United States Patent
Gu

(10) Patent No.: US 9,578,039 B2
(45) Date of Patent: Feb. 21, 2017

(54) OAM SECURITY AUTHENTICATION METHOD AND OAM TRANSMITTING/RECEIVING DEVICES

(71) Applicant: Celestica Technology Consultancy (Shanghai) Co., Ltd., Shanghai (CN)

(72) Inventor: Yu-Jie Gu, Shanghai (CN)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 176 days.

(21) Appl. No.: 14/516,296

(22) Filed: Oct. 16, 2014

(65) Prior Publication Data

US 2015/0180881 A1 Jun. 25, 2015

(30) Foreign Application Priority Data

Dec. 23, 2013 (CN) .......................... 2013 1 0718892

(51) Int. Cl.

| | |
|---|---|
| ***G06F 21/00*** | (2013.01) |
| ***H04L 29/06*** | (2006.01) |
| ***H04L 12/751*** | (2013.01) |
| *H04L 12/26* | (2006.01) |
| *H04L 12/951* | (2013.01) |
| *H04N 21/2381* | (2011.01) |

(52) U.S. Cl.
CPC ............. *H04L 63/123* (2013.01); *H04L 45/02* (2013.01); *H04L 63/08* (2013.01)

(58) Field of Classification Search
CPC ......... H04L 63/123; H04L 63/08; H04L 45/02
See application file for complete search history.

(56) References Cited

U.S. PATENT DOCUMENTS 8,687,501 B1 * 4/2014 Schultz ............... H04L 43/0811 370/241
2005/0271209 A1 * 12/2005 Sahasrabudhe ........... H04L 9/12 380/270
2007/0162740 A1 * 7/2007 Relan ................. H04L 63/0281 713/153

FOREIGN PATENT DOCUMENTS

JP WO 2015174354 A1 * 11/2015 ......... H04N 21/2381

OTHER PUBLICATIONS

Blobel, Bernd; “Analysis, Design and Implementation of Secure and Interoperable Distributed Health Information Systems”; Sep. 2002, IOS Press, pp. 198-203.*
Alka Aman, Rajeev G. Vishwakarma; “Secure message authentication using true random number generator based on Signcryption scheme using ECC”; Oct. 2012; CCSEIT ’12: Proceedings of the Second International Conference on Computational Science, Engineering and Information Technology; Publisher: ACM; pp. 760-765.*

* cited by examiner

*Primary Examiner* — Michael S McNally
*Assistant Examiner* — Courtney Fields
(74) *Attorney, Agent, or Firm* — Nixon Peabody LLP

(57) ABSTRACT

The present invention provides an operations, administration and maintenance (OAM) security authentication method and OAM packet transmitting/receiving devices. An OAM packet is authenticated by utilizing a random number and an authentication code. A threshold for the number of failed authentication is determined. If the number of failed authentication is greater than the threshold, the random number will be updated. According to the present invention, OAM packets constructed by malicious users or tampered with may be detected to increase security of OAM packets and avoid a denial-of-service (DOS) attack.

14 Claims, 5 Drawing Sheets

Generating a local random number at a receive end
Informing a transmit end of the local random number, and recording and storing the local random number as a transmit end random number
Transmitting an OAM packet having a random number TLV associated with the transmit end random number from the transmit end to the receive end
Extracting the transmit end random number from the received OAM packet having a random number TLV
Determining whether the local random number is the same as the transmit end random number of the received OAM packet
Y
N
Completing random number authentication
Discarding the OAM packet

OAM SECURITY AUTHENTICATION METHOD AND OAM TRANSMITTING/RECEIVING DEVICES

CROSS-REFERENCE TO RELATED APPLICATION

This application claims the priority of Chinese patent application No. 201310718892.4, filed on Dec. 23, 2013, which is incorporated herewith by reference.

BACKGROUND OF THE INVENTION

1. Field of the Invention

The present invention relates generally to computer networks, and more particularly, to an OAM security authentication method and OAM transmitting/receiving devices.

2. The Prior Arts

According to the actual needs of network operators, network management is divided into three categories: operations, administration and maintenance (OAM). OAM involves analyzing, predicting, administering and managing any system or network. The OAM features may include link monitoring, fault detection, and so on.

Moreover, Ethernet OAM technology includes a two-level technology: link-level Ethernet OAM technology and network-level Ethernet OAM technology. With regard to the link-level Ethernet OAM technology, this technology is generally used in an Ethernet physical link among provider edge devices, customer edge devices and customers (also called "last mile") to monitor the link state between the customer network and the operator network. The typical protocol is an EFM OAM protocol. In other words, customers may monitor the link state between two devices through point-to-point devices using Ethernet features. Regarding the network-level Ethernet OAM technology, the network-level Ethernet OAM technology is generally applied to the network access convergence layer. Such an Ethernet OAM technology covers link monitoring, remote fault detection and so no. The typical protocol of this technology is a connectivity fault detection (CFD) protocol.

Therefore, for the sake of meeting the requirement of avoiding the CFD protocol to be attacked through the Internet, it is necessary to provide a method for authenticating a received CFD packet.

SUMMARY OF THE INVENTION

In light of the foregoing drawbacks, an objective of the present invention is to provide an operations, administration and maintenance (OAM) security authentication method and OAM transmitting/receiving devices, thereby overcoming the problems of low reliability and security of OAM packets and a denial-of-service (DOS) attack.

For achieving the foregoing objective, the present invention provides an OAM security authentication method, including the steps of determining a local random number at an receive end and a transmit end random number at a transmit end, wherein the local random number is the same as the transmit end random number; transmitting an OAM packet having a random number type-length-value (TLV) field, wherein a value of the random TLV field is the transmit end random number; and comparing the value of the random number TLV field with the local random number while receiving the OAM packet, wherein if the value of the random number TLV field is the same as the local random number, random number authentication is successful.

Preferably, the present invention further includes the steps of adding an authentication code TLV to the OAM packet as the transmit end; comparing the value of the authentication code TLV with an authentication code received by the receive end after completing the random number authentication with respect to the OAM packet at the receive end, wherein if the value of the random number TLV is not the same as the authentication code, the number of failed authentication is incremented by 1; and changing the random number when the number of failed authentication is greater than a threshold.

Preferably, the authentication code TLV includes a MD5 code TLV. The value of the MD5 code TLV of the transmitted OAM packet includes a MD5 code generated by a MD5 algorithm at the transmit end. In addition, the authentication code received by the receive end includes a MD5 code generated by the MD5 algorithm at the receive end.

Preferably, when the step of changing the random number includes the steps of generating a new random number at the receive end; informing the transmit end of the new random number; using the new random number as the transmit end random number; and changing the local random number into the new random number and setting the number of failed authentication to 0 while the receive end receives the OAM packet having the value of the random number TLV that is the new random number.

Preferably, when the step of informing the transmit end of the new random number includes the steps of adding a new random number TLV to a continuity check message (CCM) packet at the receive end and setting the value of the new random number TLV as the new random number.

According to the present invention, the present invention further provides an OAM transmitting device. The OAM transmitting device includes a random number TLV add-on module for adding a random number TLV to an OAM packet at a transmit end.

Preferably, the OAM transmitting device further includes an authentication code TLV to the OAM packet at the transmit end.

Preferably, the authentication code TLV includes a MD5 code TLV. The MD5 code is generated by a MD5 algorithm at the transmit end. Additionally, the MD5 code is used as a value of the MD5 code TLV.

Preferably, the present invention further includes a new random number receive module for receiving a value of a random number TLV from a CCM packet as the transmit end random number.

Moreover, the present invention further provides an OAM receiving device, including a random number authentication module for authenticating a random number of an OAM packet at a receive end and comparing the local random number with the value of the random number TLV of the received OAM packet, wherein if the local random number is the same as the value of the random number TLV, random number authentication is successful.

According to the present invention, the present invention further includes an authentication code authentication module for authenticating an authentication code of the received OAM packet and comparing the value of the random number TLV with an authentication code received by the received end after completing the random number authentication at the receive end, wherein if the value of the random number TLV is not the same as the authentication code, the number of failed authentication is incremented by 1.

Preferably, the authentication code TLV includes a MD5 code TLV. The authentication code received by the receive end includes a MD5 code generated by a MD5 algorithm at the receive end.

The present invention further includes a random number update module for comparing the number of failed authentication with a threshold, generating a new random number, adding the new random number TLV to a CCM packet and transmitting the new random number TLV to the OAM packet at a transmit end if the number of failed authentication is greater than the threshold; and preprocessing the new random number of the received OAM packet and comparing the value of the random number TLV of the received OAM packet with the new random number, wherein if the value of the random number TLV is the same as the new random number, the local random number is changed to the new random number, preprocessing of the new random number is stopped and the number of failed authentication is set to 0.

As described above, the OAM security authentication method and the OAM transmitting/receiving devices may bring about the following technical effects. Security of OAM packets may be increased, and a denial-of-service (DOS) attack may be avoided due to OAM packets constructed by malicious users or tampered with.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
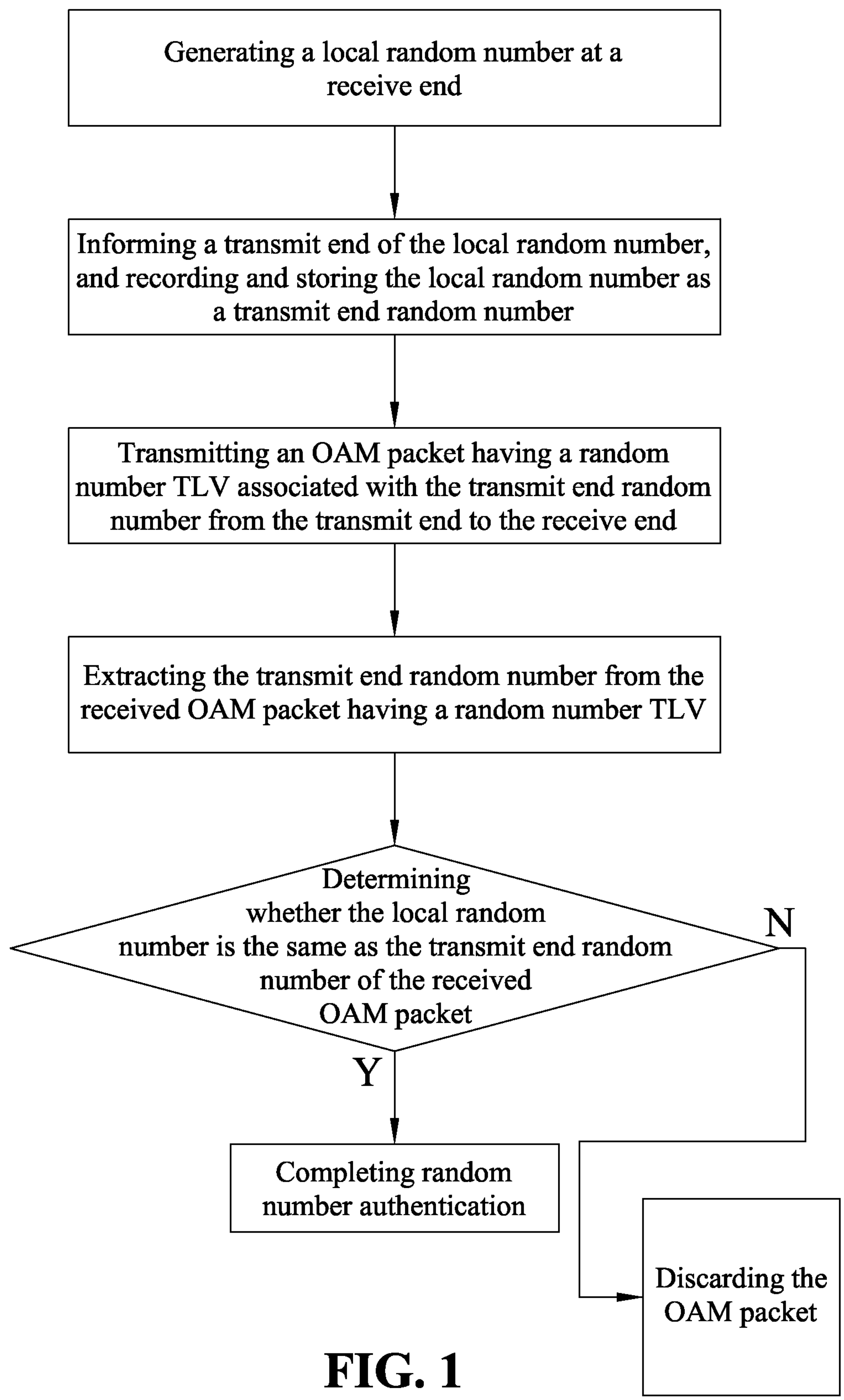
FIG. 1 is a flow chart illustrating an operations, administration and maintenance (OAM) security authentication method and device thereof according to the present invention.

The accompanying drawings are included to provide a further understanding of the invention, and are incorporated in and constitute a part of this specification. The drawings illustrate embodiments of the invention and, together with the description, serve to explain the principles of the invention.

With regard to FIGS. 1-5, the drawings showing embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

In light of the foregoing drawings, an objective of the present invention is to provide an operations, administration and maintenance (OAM) security authentication method. According to FIG. 1, the OAM security authentication method of the present invention includes the following steps.

Referring to FIG. 1, a local random number is determined at a receive end. Also, a transmit end random number is determined at a transmit end. The local random number and the transmit end random number are the same. The specific implementation method may include the following steps. 1. The local random number may be generated at the receive end. In other words, the local random number may be generated by a related random number generation function or a related random number generation algorithm.

2. The receive end may inform the transmit end of the new random number. That is to say, the receive end may add a new random number type-length-value (TLV) to A transmitted continuity check message (CCM). The value of TLV or the value of TLV field means the value of the value field in the TLV field. Accordingly, the value of the new random number TLV is the local random number.

3. The transmit end utilizes the local random number as a transmit end random number. In other words, the transmit end may receive the CCM packet, obtain the value of the new random number TLV, and utilize the value of the new random number TLV (i.e., the local random number) as a transmit end random number.

The transmit end may add a random number TLV field to the transmitted OAM packet. The value of the random number TLV field is the transmit end random number. According to the present invention, the value of the random number TLV field in the OAM packet is the value of the new random number TLV in the received CCM packet at the transmit end. That is to say, the transmit end random number and the local random number of the receive end are the same.

When the receive end receives the OAM packet, it may be determined whether the value of the random number TLV of the OAM packet and the local random number are the same. If so, random number authentication is successful, and then proceed to the following processing. If not, random number authentication is failed, and the OAM packet is discarded. In other words, when the receive end receives the OAM packet, the value of the random number TLV may be extracted from the OAM packet such that a transmit end random number is obtained. Subsequently, it is determined whether the transmit end random number and the local random number are the same. If so, random number authentication is successful, and then proceed to the following processing. Otherwise, if not, the OAM packet may be tampered with, and random number authentication is failed. Accordingly, the OAM packet is an invalid packet, and the OAM packed is discarded.

Figure 3:
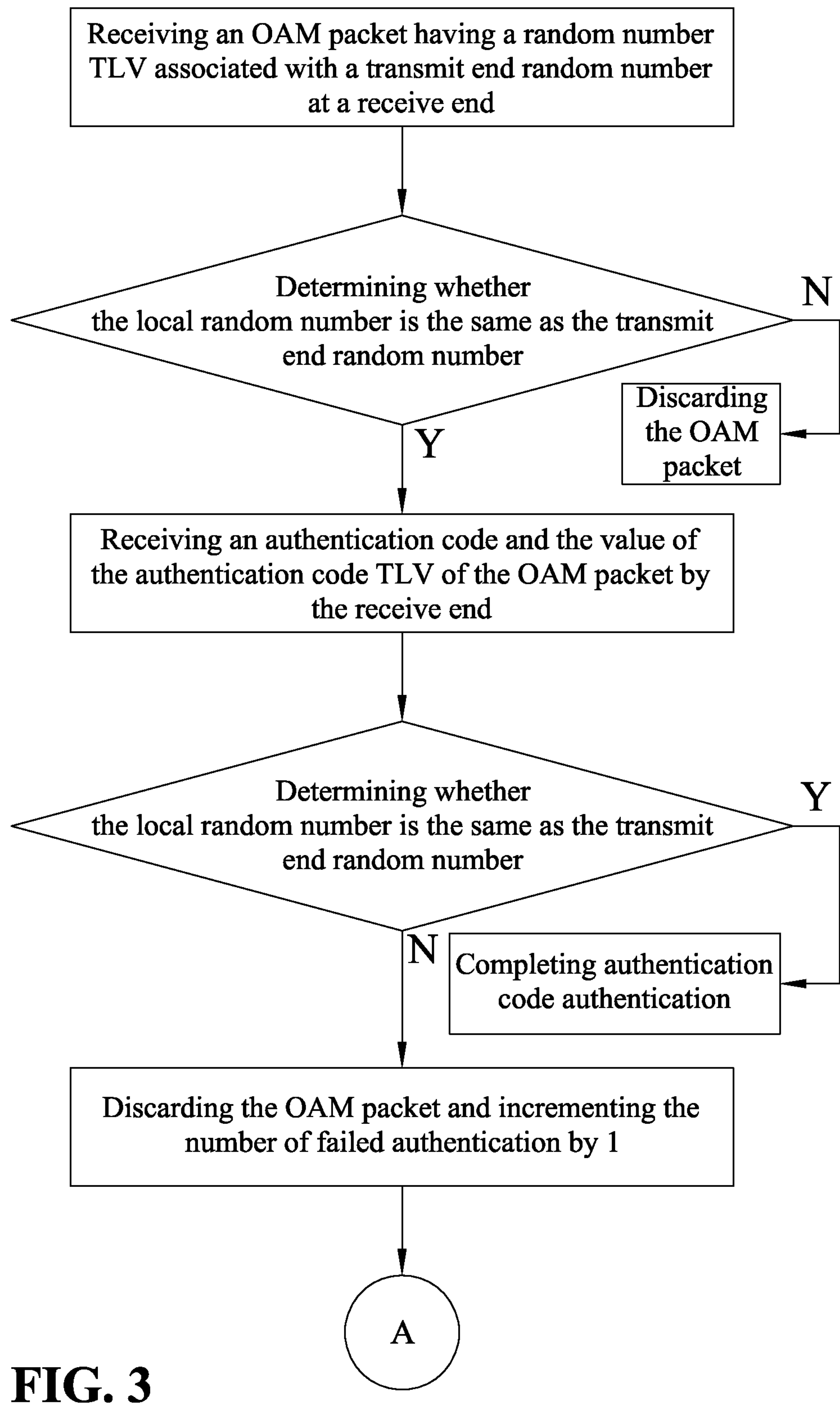
FIG. 3 is a flow chart of an updated random number showing the OAM security authentication method and device thereof according to the present invention.
Figure 3:
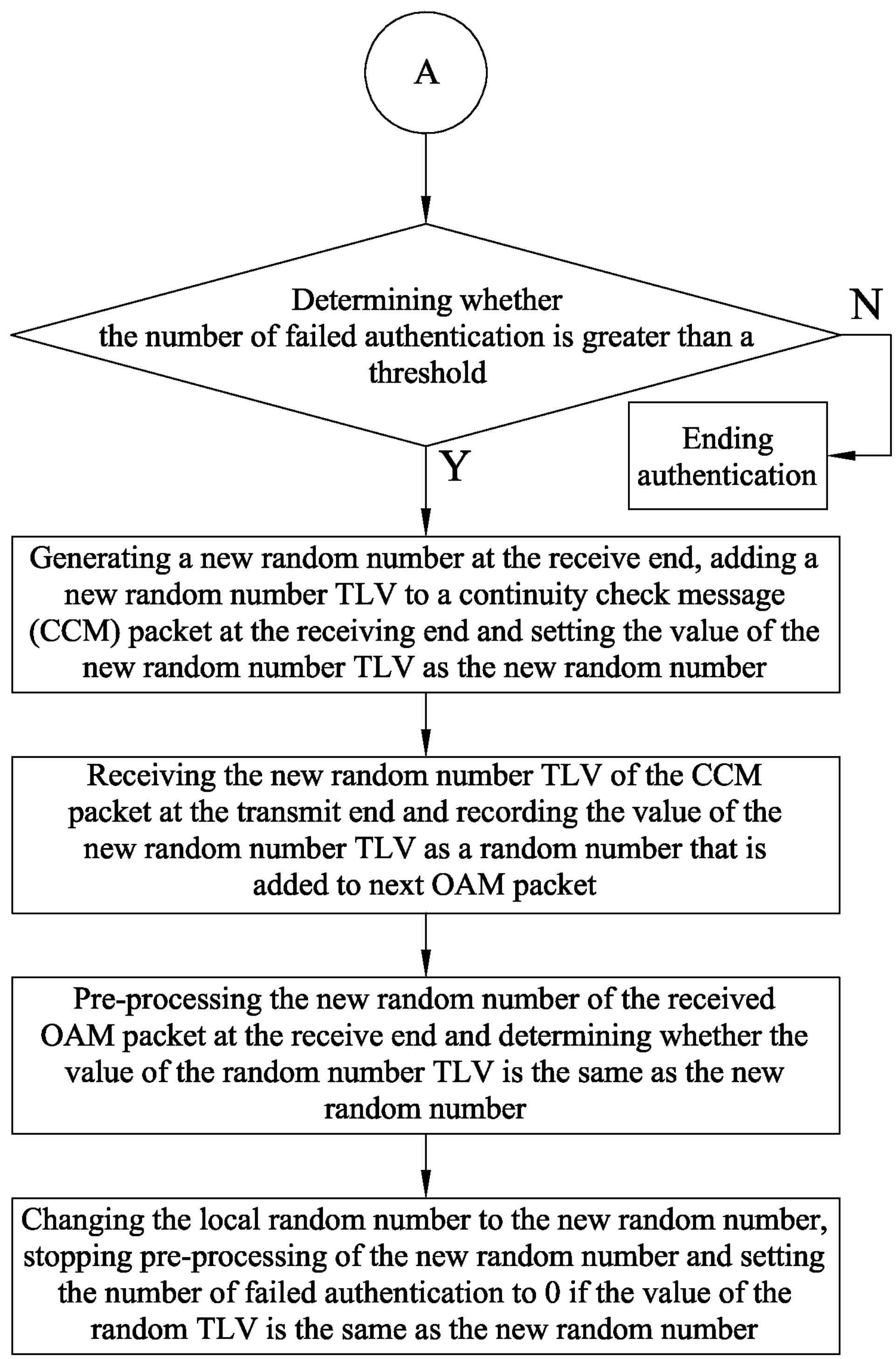

Referring to FIG. 3, the method of the present invention further includes the following steps.

The transmit end may add an authentication code TLV to the transmitted OAM packet. In other words, the authentication code TLV may include a MD5 code TLV. The value of the MD5 code TLV of the transmitted OAM packet includes a MD5 code generated by a MD5 algorithm at the transmit end. After completing the random number authentication with respect to the OAM packet at the receive end. Next, it is determined whether the value of the authentication code TLV is the same as an authentication code received by the receive end. If not, the authentication code authentication is failed. The number of failed authentication is incremented by 1. In other words, the authentication code authentication may include authentication such as MD5 code authentication. When the authentication code includes a MD5 code, the value of the MD5 code TLV of the OAM packet at the receive end may include a MD5 code generated by a MD5 algorithm at the transmit end. Accordingly, it is determined whether the value of the MD5 code TLV is the same as the MD5 code received by the receive end. If so, authentication of the authentication code is successful, and then proceed to the following processing. If not, the OAM packet may be tampered with and discarded. Therefore, authentication of the authentication code is failed. The number of failed authentication is incremented by 1. If the authentication code only includes a MD5 code, the authentication code TLV is the MD5 code TLV.

If the number of failed authentication is greater than a threshold, the random number may be changed. If the number of failed authentication is less than or equal to the threshold, authentication is ended. That is to say, a threshold is determined for authentication code authentication at the receive end. If authentication of an authentication is failed, the number of failed authentication is incremented by 1. After that, the number of failed authentication is compared with the threshold. If the number of failed authentication is greater than the threshold, the random number is changed. If the number of failed authentication is less than and equal to the threshold, authentication is ended.

The step of changing the random number includes the following steps.

The receive end may generate a new random number, and inform the transmit end of the new random number. According to the present invention, a new random number may be generated by a related random number generation function or a related random number generation algorithm. The receive end may add the new random number TLV to the transmitted CCM packet. Additionally, the value of the new random number TLV is the new random number After the transmit end receives the CCM packet, the value of the new random number TLV is recorded and stored as the transmit end random number. That is, the new random number is used as the value of the random number TLV of the transmitted OAM packet.

The local random number is changed to the new random number while the receive end receives the value of the random number TLV that is the OAM packet having the new random number. The number of failed authentication is set to 0. In other words, a new random number is generated at the receive end. After the receive end informs the transmit end of the new random number, the new random number of the received OAM packet is preprocessed. That is, the value of the random number TLV of the received OAM packet is compared with the new random number. If the value of the random number TLV is not the same as the new random, preprocessing is ended, and the OAM packet is processed based on the original method. If the value of the random number TLV is the same as the new random number, the local random number is changed to the new random number, and the number of failed authentication is reset to 0. Preprocessing of the new random number of the received OAM packet is cancelled. If the new random number is cancelled in the CCM packet, a new random TLV is no longer added to the CCM packet. When preprocessing is ended, the OAM packet is processed based on the original method. In other words, preprocessing of a new random number is performed prior to the random number authentication.

The type of the above-mentioned TLV is known as a type of protocol predefined TLV. For example, the type of the random number TLV may use 61, the type of the new random number TLV may use 62, and the protocol type of the MD5 code may use 63.

Figure 2:
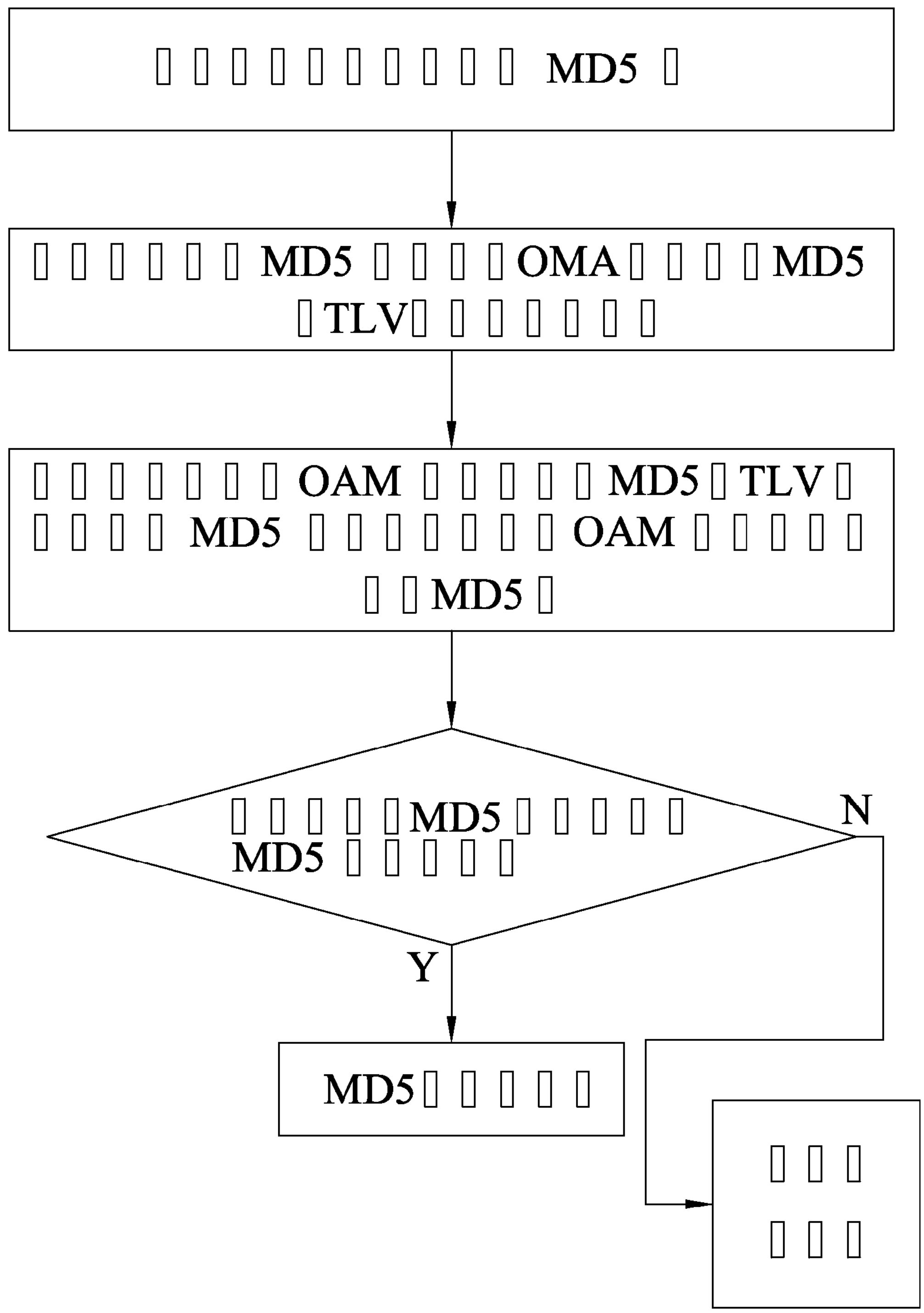
FIG. 2 is a flow chart of MD5 code authentication showing the OAM security authentication method and device thereof according to the present invention.

FIG. 2 shows a flow chart of a MD5 code authentication. A transmit end may generate a MD5 code, add the MD5 code to the MD5 code TLV of an OAM packet, and transmit the OAM packet having the MD5 code TLV to a receive end. The receive end may extract the transmit end MD5 code from the MD5 code TLV of the received OAM packet. A receive end MD5 code is generated in the OAM packet. Subsequently, it is determined whether the transmit end MD5 code and the receive end MD5 code are the same. If so, authentication of the MD5 code is successful; otherwise, authentication of the MD5 code is failed.

Figure 4:
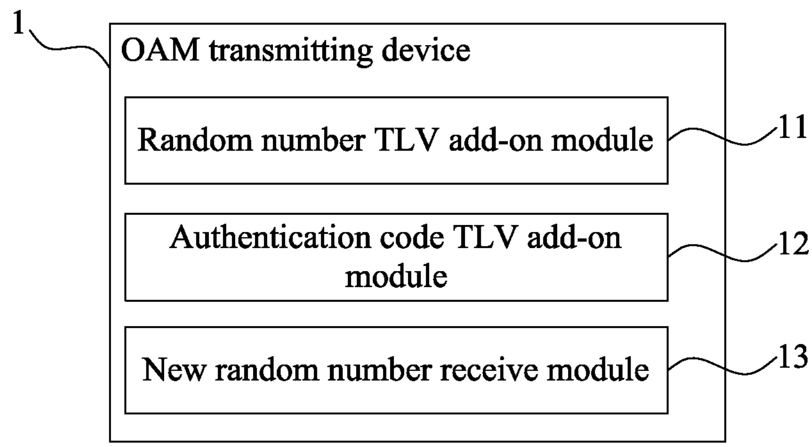
FIG. 4 is a block diagram of an OAM transmitting device showing the OAM security authentication method and device thereof according to the present invention.

As shown in FIG. 4, the present invention further provides an OAM transmitting device. The OAM transmitting device includes a random number TLV add-on module for adding a random number TLV to an OAM packet at a transmit end. In other words, the OAM transmitting device may add a random number TLV to an OAM packet at a transmit end. Additionally, the random number of an OAM receiving device is the value of random number TLV in the OAM packet.

Moreover, the OAM transmitting device further includes an authentication code TLV add-on module. That is to say, the authentication code TLV add-on module may add an authentication code TLV to the transmitted OAM packet. The authentication method for authenticating the OAM receiving device may also authenticate the authentication code TLV. Accordingly, the authentication code TLV may include a MD5 code TLV. The MD5 code authentication method is used in both the OAM transmitting device and the OAM receiving device. The authentication code TLV add-on module may generate a MD5 code, and the MD5 code is generated by a MD5 algorithm at the transmit end. The MD5 code is used as a value of the MD5 code TLV.

The OAM transmitting device further includes a new random number receive module for receiving a value of a random number TLV from a CCM packet as the transmit end random number. The value is used as a value of a random number TLV in the transmitted OAM packet. According to the present invention, the new random receive module may obtain and store the value of the new random number TLV as a transmit end random number from the received CCM packet. The transmit end random number is used as the value of the random number TLV added in the transmitted OAM packet.

Figure 5:
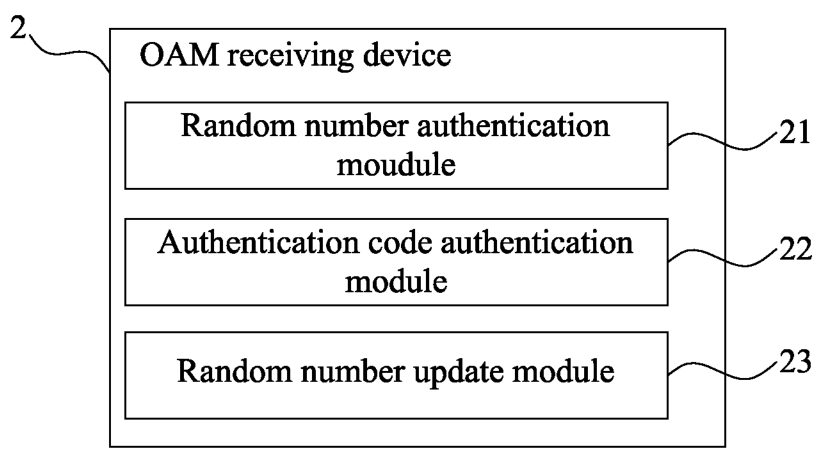
FIG. 5 is a block diagram of an OAM receiving device showing the OAM security authentication method and device thereof according to the present invention.

As shown in FIG. 5, the present invention further provides an OAM receiving device. The OAM receiving device may include a random number authentication module for authenticating a random number of an OAM packet at a receive end and comparing the local number with the value of the random number TLV of the received OAM packet. If the local random number is the same as the value of the random number TLV random number authentication is successful. Moreover, the random number authentication module may authenticate the random number of the received OAM packet. The local random number is compared with the value of the random number TLV of the received OAM packet. If so, random number authentication is successful; otherwise, the OAM packet is tampered with, random number authentication is failed and the OAM packet is discarded.

The OAM receiving device further includes an authentication code authentication module for authenticating an authentication code of the receive OAM packet and comparing the value of the random number TLV with an authentication code received by the received end after completing the random number authentication at the receive end. If the value of the random number TLV is not the same as the authentication code, the number of failed authentication is incremented by 1. The authentication code TLV may include a MD5 code TLV, and the authentication code received by the receive end may include a MD5 code generated by a MD5 algorithm at the receive end. In other words, when the authentication code includes a MD5 code, the authentication code obtained by the authentication code authentication module may include a MD5 code generated by a MD5 algorithm at the receive end. Subsequently, the value of the MD5 code TLV is compared with the MD5 code obtained by the authentication code authentication module. If the value of the MD5 code TLV and the MD5 code are the same, authentication of the authentication code is successful, and then proceed to the following processing; otherwise, if not, the received OAM packet is discarded, authentication of the authentication code is failed, and the number of failed authentication is incremented by 1.

In addition, the OAM receiving device of the present invention further includes a random number update module for comparing the number of failed authentication with a threshold, generating a new random number, adding the new random number TLV to a CCM packet and transmitting the new random number TLV to the OAM packet at a transmit end if the number of failed authentication is greater than the threshold; and preprocessing the new random number of the received OAM packet and comparing the value of the random number TLV of the received OAM packet with the new random number. If the value of the random number TLV is the same as the new random number, the local random number is changed to the new random number, preprocessing of the new random number is stopped and the number of failed authentication is set to 0. In other words, the OAM receiving device may generate a new random number, add the new random number TLV to a CCM packet, and transmit the new random number TLV to the OAM packet at a transmit end. Preprocessing of the new random number of the received OAM packet may be performed by the OAM receiving device. Accordingly, preprocessing of the new random number may be performed prior to authentication the random number. The step of preprocessing further includes a step of comparing the value of the random number TLV of the OAM packet and the new random number. If they are not the same, preprocessing is ended. The OAM packet is processed according to the original method. If they are the same, the local random number is changed to the new random number, the number of failed authentication is reset to 0, and preprocessing of the new random number of the received OAM packet is cancelled. Cancelling a new random number in the CCM packet means no longer adding a new random number to the CCM packet. If preprocessing is ended, the OAM packet is processed based on the original method.

From the above, the OAM security authentication method and the OAM transmitting/receiving devices of the present invention may perform authentication of random numbers and authentication codes. A threshold is determined for the number of failed authentication. If the number of failed authentication is greater than the threshold, the random number may be updated while authentication of the random number is performed. Accordingly, OAM packets constructed by malicious users or tampered with may be detected to increase security of OAM packets and avoid a DOS attack. Therefore, it is clear that the present invention may effectively overcome the aforementioned prior-art issues, and has industrial applicability.

The above exemplary embodiment describes the principle and effect of the present invention, but is not limited to the present invention. It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An operations, administration and maintenance (OAM) security authentication method, comprising the steps of:

generating a local random number at a receive end and transmitting the local random number to a transmit end;

regarding the local random number as a transmit end random number at the transmit end;

determining the local random number at the receive end and the transmit end random number at the transmit end, wherein the local random number is the same as the transmit end random number;

transmitting an OAM packet having a random number type-length-value (TLV) field, wherein a value of the random number TLV field is the transmit end random number; and comparing the value of the random number TLV field with the local random number while receiving the OAM packet, wherein if the value of the random number TLV field is the same as the local random number, random number authentication is successful.

2. The OAM security authentication method according to claim 1, further comprising the step of:

adding an authentication code TLV to the OAM packet at the transmit end.

3. The OAM security authentication method according to claim 2, further comprising the step of:

comparing the value of the authentication code TLV with an authentication code received by the receive end after completing the random number authentication with respect to the OAM packet at the received end, wherein if the value of the random number TLV is not the same as the authentication code, the number of failed authentication is incremented by 1.

4. The OAM security authentication method according to claim 1, further comprising the step of:

changing the random number when the number of failed authentication is greater than a threshold.

5. The OAM security authentication method according to claim 2, wherein the authentication code TLV comprises a MD5 code TLV, the value of the MD5 code TLV of the transmitted OAM packet comprises a MD5 code generated by a MD5 algorithm at the transmit end, and the authentication code received by the receive end comprises a MD5 code generated by the MD5 algorithm at the receive end.

6. The OAM security authentication method according to claim 4, wherein the step of changing the random number comprises the steps of: generating a new random number at the receive end; informing the transmit end of the new random number; and using the new random number as the transmit end random number; and changing the local random number into the new random number.

7. The OAM security authentication method according to claim 6, further comprising the steps of:

setting the number of failed authentication to 0 while the receive end receives the OAM packet having the value of the random number TLV that is the new random number.

8. The OAM security authentication method according to claim 6, wherein the step of informing the transmit end of the new random number comprises the steps of: adding a new random number TLV to a continuity check message (CCM) packet at the receive end and setting the value of the new random number TLV as the new random number.

9. An operations, administration and maintenance (OAM) transmitting device, comprising:

a random number type-length-value (TLV) add-on module for adding a random number TLV to an OAM packet at a transmit end; and an authentication code TLV add-on module for adding an authentication code TLV to the OAM packet at the transmit end;

wherein a receive end generates a local random number and transmits the local random number to the OAM transmitting device as the random number TLV, wherein the authentication code TLV comprises a MD5 code TLV, and the MD5 code is generated by a MD5 algorithm at the transmit end, and the MD5 code is used as a value of the MD5 code TLV, wherein the value of the authentication code TLV and an authentication code received by the receive end are compared after completing the random number TLV authentication with respect to the OAM packet at the received end, wherein if the value of the random number TLV is not the same as the authentication code, the number of failed authentication is incremented by 1.

10. The OAM transmitting device according to claim 9, further comprises a new random number receive module for receiving a value of a random number TLV from a CCM packet as the transmit end random number.

11. An operations, administration and maintenance (OAM) receiving device, comprising:

a random number authentication module for authenticating a random number of an OAM packet at a receive end and comparing the a local random number with the value of the random number type-length-value (TLV) of the received OAM packet, wherein if the local random number is the same as the value of the random number TLV, random number authentication is successful, wherein the random number TLV is transmitted from a transmit end, and the OAM receiving device transmitting the local random number to the transmit end as the random number TLV; and an authentication code authentication module for authenticating an authentication code of the received OAM packet and comparing the value of the random number TLV with an authentication code received by the received end after completing the random number authentication at the receive end, wherein if the value of the random number TLV is not the same as the authentication code, the number of failed authentication is incremented by 1.

12. The OAM receiving device according to claim 11, wherein the authentication code TLV comprises a MD5 code TLV, and the authentication code received by the receive end comprises a MD5 code generated by a MD5 algorithm at the receive end.

13. The OAM receiving device according to claim 11, further comprises a random number update module for comparing the number of failed authentication with a threshold, generating a new random number, adding the new random number TLV to a CCM packet and transmitting the new random number TLV to the OAM packet at a transmit end if the number of failed authentication is greater than the threshold; and preprocessing the new random number of the received OAM packet and comparing the value of the random number TLV of the received OAM packet with the new random number.

14. The OAM receiving device according to claim 13, wherein if the value of the random number TLV is the same as the new random number, the local random number is changed to the new random number, preprocessing of the new random number is stopped and the number of failed authentication is set to 0.

* * * * *